3,584,117
MEDICINAL PRODUCTS FROM PLACENTA TISSUE AND PROCESSES OF PREPARING SAME
Louis W. Granirer, Rockaway Park, N.Y.; Minna Granirer, Samuel Granirer, and Robert I. Pearlman, executors of said Louis W. Granirer, deceased
No Drawing. Continuation of abandoned application Ser. No. 299,144, July 31, 1963, which is a continuation-in-part of application Ser. No. 113,059, May 29, 1961. This application Nov. 7, 1967, Ser. No. 701,465
Int. Cl. A61k 17/00
U.S. Cl. 424—105
9 Claims

ABSTRACT OF THE DISCLOSURE

The present invention relates to a method of recovering medicinally active components from placenta-derived material. More particularly, a medicinal product is recovered from an aqueous alcoholic placenta extract by admixing with soluble portions of said extract an alkali or alkaline earth metal salt so as to precipitate a medicinal product. The foregoing may occur before or after the treatment of said extract with base according to the system of U.S. 2,907,695. The product of the invention has been found to be effective for treating osteoarthritis.

U.S. Pat. 2,907,695, issued Oct. 6, 1959, to Elisabeth Adam and Louis W. Granirer, describes a composition derived from placenta and having useful pharmaceutical properties. The present invention relates to, and represents further advancements in, work in the art of said patent.

The present application is a continuation-in-part application of Ser. No. 113,059, filed May 29, 1961 and a continuation of application Ser. No. 299,114, filed July 31, 1963, now abandoned, in the name of Louis W. Granirer.

According to the present invention an improved method of recovery of the placenta-derived material is provided; an improved substance containing the placenta-derived material is obtained, and the placenta-derived material is disclosed as useful for treatment of a malady as to which its effectiveness was not heretofore appreciated. The compositions of the invention can be used in human or animal therapy.

According to U.S. Pat. 2,907,695, medicinal values are derived from the human placenta by contacting the placenta in finely divided form with an acidic, aqueous alcohol solvent to dissolve from the placenta an extract, and base is added to the solvent containing the extract, to precipitate the medicinal values herein referred to as placenta-derived material. This material is useful for relieving the pains and symptoms of rheumatoid arthritis.

The structural formula for the placenta-derived material is not known. It is, however, a magnesium phosphate complex of crystal structure and analysis as is set forth in the said patent. Additional analytical data is set forth hereinafter.

It has now been found that a new type of placenta-derived material is obtained and the yield of the placenta-derivable material can be increased by adding a salt, preferably an alkali or alkaline earth metal salt, to the solvent containing placenta extract dissolved therein so that there is obtained a complex of the salt and ingredients of the placenta extract. The complex so derived in similar in pharmaceutical activity to the placenta-derived material of said patent.

Further, it has been found that improved pharmaceutical substances can be obtained by reacting the placenta-derived material of said patent and/or the placenta derived material of the instant application, with penicillin. The resulting substance is distinctive in that it retains the pharmaceutical effectiveness of the penicillin, while accommodating the penicillin for administration to patients who are allergic to penicillin when administered in any of its usual forms.

Still another discovery of the instant invention is that the placenta-derived material of the said patent and of the instant invention is useful for relieving the pains and symptoms of osteoarthritis.

PROCESS OF RECOVERY

In the recovery of medicinal values from placenta by contacting the placenta with an acidic solvent, such as an acidic, aqueous alcohol solution, to provide a solution of an extract of the placenta dissolved in the solvent and leave a portion of the placenta undissolved as placenta residue, the invention provides the improvement of admixing with extract a salt, preferably inorganic, of an alkali metal or alkaline earth metal, to form with the ingredients of said extract a pharmaceutically acceptable salt complex. The salt complex has a medicinal value substantially similar to that of the magnesium phosphate complex derived by precipitating same from an acidic, aqueous ethanol solution of such extract by the addition of base.

The various alkali metal and alkaline earth metal salts, both organic and inorganic, may be employed. Examples thereof are: potassium chloride, potassium gluconate, potassium tribasic phosphate, potassium dibasic phosphate, potassium bicarbonate, potassium citrate, potassium salicylate, potassium lactate, sodium dibasic phosphate, sodium lactate, sodium salicylate, sodium tribasic phosphate, sodium benzoate, sodium bicarbonate, sodium chloride, sodium citrate, sodium sulphate, calcium gluconate, calcium lactate, calcium dibasic phosphate, calcium tribasic phosphate, calcium carbonate, calcium citrate, calcium levulinate, calcium mandelate, calcium methionate, calcium chloride, calcium salicylate, magnesium dibasic phosphate, magnesium tribasic phosphate, magnesium lactate, magnesium carbonate, magnesium citrate, magnesium salicylate, magnesium thiosulfate, magnesium trisilicate, strontium lactate, strontium citrate, strontium carbonate, strontium phosphate tribasic, strontium salicylate.

Magnesium phosphate is especially preferred. The phosphate salts are particularly desirable. Best results have been obtained with dibasic magnesium phosphate

$(MgHPO_4 \cdot 3H_2O)$

With tribasic magnesium phosphate $(Mg_3(PO_4)_2 \cdot 5H_2O)$, upon parenteral administration, of the medicinal values, some inflammation occurs in the areas of administration. So far as has been determined the medicinal values obtained when dibasic magnesium phosphate is used, is the same in pharmaceutical effect. It is however of less potency. On a weight basis, about 60–70, e.g. 65, parts of the dibasic magnesium phosphate complex is equivalent to 15 parts of the magnesium phosphate complex of the said patent, as the complex is disclosed in FIG. 1, thereof. The pharmaceutical effects observed have been the same and the materials, on visual observation, appear to be the same.

The medicinal values provided by use of the present invention are termed "pharmaceutically acceptable salt complexes," e.g., those formed by addition of dibasic magnesium phosphate being called "dibasic magnesium phosphate complexes," this indicating the derivation, or more generally "magnesium phosphate complexes." The latter term is also used to generically denote the product of said patent, such as the product shown in FIG. 1 thereof, although the materials formed in accordance with the present invention are distinct from those formed by the process of U.S. 2,907,695.

In somewhat more detail, the finely divided placenta is contacted with a suitable solvent, which can be acidic, aqueous methyl alcohol or acidic, aqueous ethyl alcohol, or other solvent suitable to yield the placenta-derived material of said patent. A 75% ethyl alcohol, 25% water mixture can be used, and the acidic condition can be provided by addition of hydrochloric or sulfuric acid. The initial pH can be about 2.7. Following the contacting, which can be for about 2 hours at 20–30° C., the admixture can be allowed to stand in the cold to permit protein material to precipitate out. A holding period of 4–5 hours at 0° C. is recommended. This step of holding in the cold is not essential and can be omitted. After the contacting and holding step, if any, the solution having the extract dissolved therein is separated from the undissolved matter. The salt, e.g., an alkali metal or alkaline earth metal salt, can be added to the separated solution, or, alternatively, precipitation of medicinal values can be effected as is described in said patent and thereafter the inorganic salt can be added.

In the former case, following separation of the solution of extract in the solvent from undissolved matter, the alkali or alkaline earth metal salt can be added to the acidic solution, and thereafter a base, such as ammonium hydroxide or alkali metal hydroxide can be added to raise the pH to about 9–10, e.g., 9.6. The medicinal values then precipitate. Recovery and working up can be as is described in the aforesaid patent.

In the alternative procedure, medicinal values as magnesium phosphate complex are recovered by adding base to the solution of extract in acidic solvent to precipitate the values, as is described in said patent, and this provides a treated solution which contains extract derived from the placenta as a solute therein, the extract being that which is not precipitated following addition of the base. Alkali or alkaline earth metal salt is then admixed with extract of the treated solution, and this provides a salt complex as medicinal values in addition to that obtained by the addition of base.

Following addition of base to the acidic solution of extract, the precipitate of magnesium phosphate complex can be separated from the treated solution, and the treated solution can then be subjected to evaporation to remove the solvent. Extract is deposited from the solution during the evaporation and this is of a pasty consistency. The extract can be dissolved in water and the salt can be added to the solution. Apparently, the salt dissolves and simultaneously the medium becomes cloudy, and then the precipitate forms, this being a salt complex constituting medicinal values of the placenta. This precipitate can be separated and worked up as was done in recovery of magnesium phosphate complex according to said patent. Thus it is to be clearly understood that the phrase "mixing of extract of treated placenta solution with salt" encompasses mixing the salt directly with the extract, or first removing solvent to recover the solute-extract and then adding the salt to a solution prepared from same.

The amount of salt, e.g., as dibasic magnesium phosphate, can be 10–5000, preferably 100–3000, especially 1000 weight percent of the extract (solute) separated from the treated solution during the evaporation, or equivalent molar amount of other salt. When the first-mentioned procedure is employed, i.e., when the salt is added to the acidic solvent having extract dissolved therein, the amount of salt can be an amount corresponding to the just mentioned amounts, i.e., the amount which would be used if the other procedure were followed.

In the practice of the improved method, temperature and pressure are not critical. The improvement can be realized by merely adding the salt to a suitable medium in which the salt is soluble and the extract is dissolved.

While the placenta used in said patent is human placenta, mammal placenta in general can be used. Cow placenta has been found satisfactory. The cow placenta has been used as a source of the medicinal values and the product derived therefrom is suitable for human therapy. Good yields are obtained from the cow placenta.

EXAMPLE 1

Human placenta, in amount of 1 kilogram, is contacted with aqueous ethyl alcohol (75% alcohol) of pH 2.7 at 20–30° C. for 2 hours, the resulting material is allowed to stand in the cold, is filtered, and the filtrate is adjusted to pH 9.6, all as is described in the example of Pat. 2,907,695. The precipitate which is believed to be a magnesium phosphate complex is separated, and the treated solution, which contains the extract not precipitated upon addition of base, is subjected to further processing to provide additional medicinal values.

The treated solution is evaporated to dryness on a 100° C. water bath. Solute-extract is deposited from the solution. It is a dark brown, sticky substance, amounting to 20 grams. 100 grams of this material is dissolved in 8 oz. of tap water at 130° F. A dark brown solution forms readily. It is pH 4.5. To this solution, 16 oz. of water and 500 grams of dibasic magnesium phosphate is added, and the solution is stirred well at room temperature for about 1 hour. Bubbling which indicates reaction, occurs. Then, 32 oz. of water at 130° F. are added and another 500 grams of dibasic magnesium phosphate is added, and stirring is continued for about 1 hour. The resulting solution is then allowed to stand at room temperature for 3 hours. The pH of the solution is then 7.0. The solution is then poured into a Pyrex evaporating disk and subjected to evaporation in an oven at 70° C. for 3 days. The resulting products is hard and stone-like and of carmel color. This can be ground up with mortar and pestle to provide the medicinal values as a powder.

EXAMPLES 2–13

In each of a series of experiments, 100 grams of the brown solute-extract prepared in accordance with the process of Example 1 was dissolved in 500 cc. of 150° F. water so that the solution was clear. In each case, one kilogram of one of the alkaline earth metal or alkali metal salts noted below was then added (10 parts by weight of salt/weight part of solute) and thoroughly mixed. The mixture was then evaporated at a temperature of 55° C. for 3 days to form the medicinally acceptable salt complex of the present invention. The product was a hard stone-like material which was then ground to a powder with mortar and pestle.

TABLE 1

Experiments:
  2—Calcium gluconate
  3—Calcium lactate
  4—Calcium dibasic phosphate
  5—Calcium tribasic phosphate
  6—Magnesium dibasic phosphate
  7—Magnesium tribasic phosphate
  8—Potassium chloride
  9—Potassium gluconate
  10—Sodium dibasic phosphate
  11—Sodium lactate
  12—Sodium salicylate
  13—Strontium lactate To provide the medicinal value in a form suitable for parenteral administration 1 to 3, e.g., 2, grams of the foregoing salt complexes can be dissolved in 30 cc. of sterile normal saline solution (0.9 NaCl), preferably containing as preservative 0.5% benzyl alcohol and 0.01% butaben, by heating a mixture of the powder and water on a water batth at 100° C. for 35 minutes. Bubbling indicating reaction occurs during this time. The resulting solution is turbid and of pH 7.0.

This material is suitable for parenteral administration, e.g., intramuscular administration, for patients suffering from rheumatoid arthritis, osteoarthritis, or intermittent claudication. An approximate dosage is 1–2 cc. (65–130 mg.) once or twice a day for a week or as long as as is required. Dosage can be decreased as the demand decreases. The powder made by grinding with mortar and pestle can be administered orally, e.g., as capsules, and a suitable dose is 0.5 gram once daily.

COMBINATIONS WITH PENICILLIN

The invention also provides, as novel substances, the reaction product of contacting penicillin and a complex of a salt and an acidic, aqueous ethanol soluble placenta extract.

The novel combinations with penicillin can be combinations of penicillin, and placenta medicinal values as disclosed by Pat. 2,907,695, or placenta medicinal values as derived according to the instant invention. When combined with the materials derived by the procedures of the present application, the dibasic phosphate salt complexes or the tribasic phosphate salt complexes are preferred.

The penicillin can be in any of its usual forms or can be penicillin as such. Procaine penicillin G is suitable.

The combination with penicillin can be made by contacting penicillin with a pharmaceutically acceptable salt complex of an extract of placenta, such as is described hereinbefore; or in U.S. Pat. 2,907,695. Both are basically derived by contacting placenta with an acidic solvent and forming a complex therefrom.

The proportion of the components of the combination can be 2 to 30 mg., preferably 10 to 20 mg., of magnesium phosphate complex according to Pat. 2,907,695 (i.e., of the crystals as shown in FIG. 1 of Pat. 2,907,695), or a corresponding amount of dibasic magnesium phosphate complex as is produced in Example 1, above (i.e., about 4 times as much dibasic complex as the complex of said patent), per 300,000 units of penicillin. If a salt complex other than the dibasic magnesium phosphate complex is used, the amount can be the molar equivalent of the amounts mentioned herein for the magnesium phosphate complex.

Temperature and pressure are not critical. The medicinal values of the placenta dissolved in a suitable medium such as an aqueous medium, are merely added to the penicillin contained in a suitable medium. If the penicillin is in an aqueous medium as a slurry, upon stirring of the admixture of the ingredients, the penicillin goes into true solution, indicating that reaction occurs during the contacting.

The combination of placenta values and penicillin can be administered parenterally, e.g., intramuscularly, to patients sensitive or allergic to penicillin therapy. Upon such use of the combination in clinical testing with patients having a history of penicillin allergy, including allergy to dimethoxyphenyl penicillin, therapeutic responses characteristic for penicillin, without any allergic reactions, were realized.

The dosage in terms of units in penicillin and the frequency of administration can be as is the practice for penicillin alone. An advantage of the combination, however, is that the new penicillin combination is longer acting than the penicillin used in making the combination. The combination has been effective within 1 hour after administration and effectiveness has continued for 2-3 days.

In particular, the combination has been used effectively, with no allergic reaction, on patients having penicillin allergy history, in cases of sore throat, infection of the leg, acute otitis media, severe upper respiratory infection, a leg ulcer, and carbuncle of the neck. No side effects were observed and there was no indication that the combination is toxic. Detailed data will be found below.

EXAMPLE 14

To prepare a penicillin combination according to the invention, 15 cc. of the saline solution of placenta medicinal values made in Example 1 is admixed with 10 cc. of an aqueous medium containing 300,000 units per cc. of procaine penicillin G. After thorough mixing the material is left standing for 6 hours. Reaction occurs and true solution forms. The color of the solution is slightly greyish and the pH thereof is 7. This material is suitable for parenteral administration, and is stable at room temperature.

EXAMPLE 15

In a manner similar to that of Example 2, a penicillin combination is made using the product of Pat. 2,907,695 as shown in FIG. 1, thereof. 10 cc. of a normal saline solution containing 65 mg. of the placenta medicinal values of Pat. 2,907,695 were added to 10 cc. of aqueous procaine penicillin G solution (300,000 units per cc.), to provide a penicillin combination according to the invention.

EXAMPLES 16–27

1.5 grams each of the placenta derived salt complexes of Examples 2–13 were dissolved in 30 cc. sterile normal saline solution with the resulting 5% solution being sterilized in a water bath. The solution in each case was allowed to cool to room temperature and mixed with equal parts of procaine penicillin solution. The admixture was allowed to stand for 3 hours at room temperature.

The new mixtures were used in the treatment of 35 patients who had a history of severe penicillin sensitivity and were severely allergic to penicillin therapy. The patients were treated by an intramuscular injection of 2 cc. of each of the foregoing mixtures of penicillin and placenta extract derived material. The mixture was found to be non-allergic in every case in treating the 35 patients, even after repeated injections over a period of 6 to 8 weeks. There was no evidence of immediate or delayed sensitivity, either of a localized or generalized form. It is an accepted medical fact that penicillin allergy does not disappear spontaneously, and thus these experiments evidence the advantageous nature of the present invention.

The following illustrates the significant advantages afforded by combining the placenta-derived material of the present invention with penicillin in treating penicillin sensitive patients.

EXAMPLE 28

Placenta was contacted with aqueous ethyl alcohol in accordance with U.S. Pat. 2,907,695. Following contact at approximately room temperature, the admixture was allowed to stand in the cold to precipitate protein material. The precipitated material was removed and the solution having the extract dissolved therein subjected to drying so as to recover a brown residue of placenta extract. 100 grams of this brown residue of placenta extract was dissolved in 1 liter of water at 140° C. 1 kilogram of magnesium phosphate (dibasic) was added to this solution. The materials were then mixed by stirring. Thereafter they were subjected to evaporation at 70° C. in an oven. When dry, the solids were removed from the oven. A 7% solution of the dry solids was made in normal sterile saline solution. The 7% solution was thereafter resterilized for 35 minutes at 100° C. in a water bath.

Procaine penicillin G in aqueous suspension, and at a concentration of 300,000 units per cc. was stabilized with 0.2% methyl paraben and 1.04% propyl paraben. 10 cc. of the stabilized penicillin solution was admixed with 15 cc. of the 7% placenta extract solution. The admixture was shaken well and left at room temperature for 3 hours. Thereafter, patients were treated by an intramuscular injection of 2 cc. of a combination solution of penicillin and placenta extract (referred to as "New Penicillin Co.").

Table 2 sets forth the previous histories of the patients tested with respect to allergy to penicillin treatment and the results afforded by the practice of the present invention. As shown, patients with a marked penicillin allergy showed little or no allergy when treated with the penicillin-placenta extract of the present application.

TABLE 2

Case reports on the use of a new penicillin compound

| Patient | Age | Previous history | Present history | Follow-up |
|---|---|---|---|---|
| 1. E.N. | 68 H.W. | Treated in 1961 (May) for pneumonia with 6 penicillin injections. Developed severe urticaria after the last injection lasting two weeks. Warned never to take penicillin again. | Jan. 1962 developed severe sore throat and follicular tonsillitis. Temp. 104° F. (Culture revealed Strep. hemolyticus). Received 2 cc. of New Penicillin Co. Temp. became normal in 12 hours. Uneventful recovery. No local and no general reaction to the New Penicillin Co. | Observed at 4 wks., 8 wks. and 12 wks. intervals. No signs of any local or systemic reaction. |
| 2. L.K. | 55 H.W. | In 1958 received a series of penicillin injections with no untoward reactions. The last injection left a large localized swelling. One year later she received another injection of penicillin. Within a few minutes she became acutely ill; severe swelling of arms, legs, face; shock; fell unconscious to the floor; hospitalized; treated with oxygen steroids; adrenalin; etc. Recovered after 10 days; residual dermatitis lasted three weeks. | In 1960, developed a severe infection and ulcer of the leg (culture showed a staphylococcus infection). She received 2 cc. of the New Penicillin Co. There was no local or constitutional reaction. She received 2 additional injections on alternate days without any signs of a local or general reaction. The infection healed rapidly. | After 12 weeks observation showed no signs of a delayed allergic reaction. |
| 3. D.K. | 25 M. | 1959 received a penicillin injection for an infected ear and developed a severe skin reaction. Warned never to take penicillin again. | Oct. 1960 developed a recurrence of the ear infection. (Culture revealed a streptococcus hemolytic organism.) He received 1 cc. of the New Penicillin Co. No reaction; no penicillin sensitivity. 2 days later he received a similar dose. No local or general reaction. The ear ceased to drain; complete recovery. | No allergic manifestations evident at 6 weeks. |
| 4. B.T. | 45 M. | 1958—several penicillin injections with no reaction; August 1959 received 2 cc. procaine penicillin and went into shock; wheezing, cold sweat, convulsions and unconsciousness. Revived in the hospital but had a residual dermatitis for three weeks. | Sept. 1960 carbuncle of neck. Received 2 cc. of the New Penicillin Co. No signs of any local or general sensitivity. Received a similar dose two days later. No reaction. He received a total of 4 injections of the New Penicillin Co. with no allergic reaction. The carbuncle healed rapidly. | No allergic manifestations evident at 6 weeks. |
| 5. J.N. | 15 | Unable to take penicillin in any form. In Nov. 1959 took a course of 8 tablets orally of a penicillin salt and developed a severe rash and fever lasting 7 days. In 1959 he had a similar reaction following a penicillin injection. | Dec. 1960 he developed a severe pneumonia of the upper and lower lobes of the left lung which he had for 5 days; temp. 104° F. He was given 2 cc. of the New Penicillin Co. and was observed for 1 hour. There were no signs of a general or local reaction. Two days later the chest was almost clear. He received a similar dose of the New Penicillin Co. Examination 3 days later; the patient had made a complete recovery. There was no allergic response to the New Penicillin. | No signs of any allergy to the New Penicillin Co. at any time. |
| 6. L.U. | 39 H.W. | Oct. 1961 received an injection of procaine penicillin for a severe chronic sinusitis and headaches. Within twenty minutes she was covered from head to foot with giant urticaria (hives) which lasted four days. | She was not seen again until Dec. 1961, and was hospitalized; nasal culture revealed a Staphyloccus aureus infection. She received 2 cc. of the New Penicillin Co. There was no local or systemic reaction to the New Penicillin Co. She had a total of four injections with no reaction at any time. The sinusitis cleared up completely. | No signs of any allergy to the New Penicillin Co. at any time. |

Treatment of osteoarthritis

The placenta medicinal values of Pat. 2,907,695 and the placenta medicinal values of the instant application can be used to treat osteoarthritis to relieve pain and symptoms therefrom.

To treat such conditions, a saline solution as is produced in Example 1, above, can be injected (1–2 cc.) 2–3 times per week. During such administration of the placenta medicinal values for six months, no toxicity was observed.

To administer the medicinal values of Pat. 2,907,695, it can be used as a saline solution made as is described in Example 15. A normal saline solution containing 65 mg. of the placenta medicinal values per cc. of saline solution can be used.

Normal saline solution is preferred as a vehicle as it appears that smaller amounts of the medicament are required when this vehicle is employed.

The placenta values made according to the instant invention, e.g., those of Example 1, are useful for treatment of rheumatoid arthritis as well as osteoarthritis.

EXAMPLE 29

A 7% saline solution of the present placenta-derived salt complex was prepared in the same manner as described in Example 28. The sterilized solution was then administered to a group of people exhibiting osteoarthritis symptoms. Histories of people treated are set forth in Table 3, as are the results obtained after giving injections of 2 cc. per dose of the 7% saline solution of the placenta-derived salt complex of the present invention.

As shown in Table 3, treatment of patients who suffered from osteoarthritis with the placenta extract product of the present invention showed very substantial improvements in their osteoarthritis condition.

TABLE 3

A few case reports on the treatment of osteoarthritis with a placental extract

| Case | Sex | Age | Previous History | Results |
|---|---|---|---|---|
| 1 | F | 46 | Severe pain and swelling in both knees for 6 years. No response to all previous medication including cortisone (intraarticular). Confined to bed or chair most of the time. "Was told she had to live with it." | After the second injection the joint pain and swelling gradually subsided; she could sleep at night without recourse to codeine; strength and appetite improved. After the fourth treatment she became ambulatory and could walk a few blocks. She has improved steadily and has secured a job as a secretary. There is very little discomfort in the knees and is on a maintenance schedule of one treatment to every two to three weeks. |
| 2 | M | 58 | Gradual onset of severe pain and stiffness in the right hip for the past 5 years. Treatment with traction for 6 weeks in the hospital did not help. Intraarticular injections with procaine and cortisone did not benefit him. The condition became worse. The orthopedic surgeons advised an operation on the hip as a last resort. He could move only on crutches. | The response here to the placental extract was gradual. After the 6th treatment he reported that he could sleep without pain. After the 8th injection, he was able to get around without crutches. He now comes to the clinic every two weeks and is without any symptoms. The X-rays show an improvement. |
| 3 | F | 62 | Severe pain in both hands associated with tingling and a burning sensation, worse at night, so that she has to sit up in bed and shake both hands for relief. History dates back more than 2 years. Treated at many clinics with no relief. Has been taking 16 aspirin tablets a day. Forced to relinquish her job. | The response after the third injection was quite dramatic. The burning and tingling left her hands and she could sleep without medication. The improvement has continued and the pain and swelling in the distal phalangeal joints has subsided considerably. She has returned to her job as a telephone operator. |
| 4 | F | 51 | Severe pain and spasm in cervical spine for 3 years. Unable to turn neck to right or left more than a few degrees. Unable to park her car because of marked limitation of motion in neck. Has not slept in months because of pain. Has been wearing an orthopedic neck brace with no relief. Traction did not help. She was really desperate. The condition was getting worse. Diathermy; cortisone; codeine, etc., did not benefit her. | Injections with the placental extract made a remarkable improvement. For the first time in years she could turn her head without pain. She was able to sleep nights on a pillow, something she had not done in a long while. She drives her car again and has made an excellent response. She is on maintenance therapy now with an injection every 2 to 3 weeks. |

EXAMPLE 30

A study of the treatment of 84 patients by the compositions of the present invention was made, the composition being the 7% saline solution of Example 29. The patients were selected after careful evaluation, their main complaint being osteoarthritis of the knees. No patient had received any intra-articular therapy, steroids, phenylbutazone or aralen within six months of the start of the trial. All patients had been on a basic program of rest and aspirin. Forty-two patients received 1 cc. of solution "A" parenterally twice a week, which was revealed later after the completion of the study to contain a placebo. The other forty-two patients received a bi-weekly injection of solution "B" which was the 7% solution of Example 29. After six weeks the injections were maintained on a weekly basis. The "A" group average 53.1 years of age with a range of 39 to 65 years. Of the "B" series, the average age was 52.5 years with a range of 40 to 70 years. The duration of osteoarthritis for the "A" group average 5.2 years and for the "B" group 6.7 years.

Complete skeletal and general examination, fluroscopy of the thorax, electrocardiography, Kahn test, blood count, sedimentation rate, urine analysis and radiological studies were carried out. Both groups of patients were observed for a period of one year.

As summarized in Table 4, of the forty-two patients receiving the "A" injections only 15% showed a satisfactory response at the end of twelve months treatment; whereas of the forty-two patients receiving the "B" injections (placenta extract of the present application), 91% showed a moderate to excellent improvement.

TABLE 4

Osteoarthritis of the knee treated with a placebo

Grade I—Complete remission—0%
Grade II—Major improvement—15%
Grade III—Minor improvement—30.5%
Grade IV—No improvement or progression—54.5%
Total patients 42

Osteoarthritis of the knee treated with a placental extract

Grade I—Complete remission—69%
Grade II—Major improvement—22%
Grade III—Minor improvement—4.3%
Grade IV—No improvement or progression—4.7%
Total patients 42

EXAMPLE 31

The following is a summary of the treatment of osteoarthritis in 82 patients with a solution of each of the alkaline salt-solute composition of Examples 2–13, using a double blind technique.

Each of the resultant salt complex powders of Examples 2–13 was then added in making a 5% solution by dissolving 1.5 grams in a 30 cc. sterile normal saline solution and placing it in a boiling water bath (100° C.) for 35 minutes.

The therapeutic dose was 2 to 5 cc. parenterally once or twice a week. With improvement the dose was reduced to 2 to 3 week intervals in osteoarthritis.

The response to a placebo was 20 to 25% with each series. The response to the alkali salt-solute group was 80 to 89%, thus evidencing the effectiveness of the present composition in treating osteoarthritis.

It was also observed that oral therapy was very useful in osteoarthritis. The salt complex was used in a single daily dose as 0.6 daily. The response here was high-excellent in 70% and a good response in 15%. The placebo (using a similar looking capsule of milk sugar) gave a response of 18% to 24%.

Tolerance and side effects did not develop in a single case treated with any of the patients treated with the compositions of the present invention.

All of the patients treated in this series had various types of osteoarthritis; the knees, hands, neck, hip and shoulders were most commonly involved. All of them had severe pain and swelling with difficulty on walking or sleeping. None had had much relief with any previous treatment, including cortisone, butazolidin, diet, spa therapy, bee venom, gold, etc. All had quite a bit of disability. Usually with the salt complex therapy of the present invention (oral or injectable) the response was rapid, and very gratifying. The pain and swelling disappeared and there was an improved sense of well being. Patients could drop their crutches or their canes and live normally without opiates.

The following is a typical case: A 49 year old physician complained of generalized joint pains which were getting worse. He had hard osteoarthritis for 10 years and it was getting so that he could hardly continue to carry on his work. The pain was chiefly in his ankles, knees, hips, hand, elbow, shoulders and the spine. There was a general feeling of malaise and poor appetite. There was a danger that he might have to quit his practice because of the greatly reduced working capacity.

After a few injections, the joint pain and swelling rapidly diminished, there was more endurance and strength and he could attend to his work with renewed hope and vigor. He said that he had never felt as well in years. He was then put on a daily maintenance dose of two capsules. Each capsule contained 0.3 gram.

As to the chemical identification of the material, the following information is for analysis of the product of Pat. 2,907,695. A sample obtained by precipitation from the acidic aqueous ethanol solvent after drying on a steam bath, had a soft waxy consistency. Also, it gave off an ammoniacal odor, in the warm state after removing from the steam bath. From an infra-red absorption curve the compound appears to be a primary amine, possible of $CH-NH_2$ type (aliphatic), plus possibly some amide. There are bands at 6.3 and 7.1 microns. These may be due to amino acid linkages, or possibly a peptide. Another possibility for the band at 6.3 microns is that the compound is a salt of a carboxylic acid (zwitterion).

Chemical analysis is as follows:

| | Percent |
|---|---|
| Magnesium | 17.4 |
| Phosphate | 47.1 |
| Total nitrogen | 5.7 |
| Ammonia | 6.2 |
| Nitrogen, calculated by difference, for organic | 0.6 |
| Sulfur | [1] 0.0 |
| Total hydrogen | 5.95 |
| Water (as moisture) | 13.5 |
| Hydrogen, calculated by difference, for organic | 0.3 |

[1] Nil.

The organic part of the sample, 3.6% of the total, was composed as follows:

| | Percent |
|---|---|
| Carbon (by analysis) | 1.79 |
| Hydrogen (from above) | 0.3 |
| Nitrogen (from above) | 0.6 |
| Oxygen (by difference) | 0.9 |

The ash content of the sample was 49.63%.

From the above, chemical, organic and ash analyses, the composition of the sample appears to be:

| | Percent |
|---|---|
| $Mg_3(PO_4)_2 \cdot 8H_2O$ | 76.8 |
| $H_2O$ | 13.5 |
| $NH_3$ | 6.2 |
| Organic | 3.6 |
| | 100.1 |

A trace of iron was also indicated. The data on the organic part of the sample leads to an empirical formula of approximately $C_{14}H_{28}N_4O_5$ or some multiple thereof.

It is noted in passing that the placenta-derived materials when combined with various other chemicals offer potential in treating various maladies. Thus, the brown residue solute extract described in Example 1 may be admixed with 25 parts by weight of the following materials, the admixture when administered in the form of 0.3 gram capsules taken three times a day having been found to give improvement in rheumatoid arthritis conditions.

(A) Chemicals of the salicylate group, e.g., sodium salicylate, aspirin, acetyl salicylic acids)

(B) The para-aminophenol type compounds, e.g., acetamilid and acetopheneditin (C) The pyrazolon derivatives, e.g., antipyrine and aminopyrine.

Additionally, when put into solution the brown residue of Example 1 can be combined with various sulfonamide drugs, the sulfonamide drug being added to the solution, and then evaporation being effected to obtain a dry powder. It has been found that a dose of .3 gram every 8 hours has given a good clinical response in patients suffering from rheumatoid arthritis. Typical sulfonamide drugs are: sulfamerazine, sulfacetamide, sulfadiazine, sulfamethazine, sulfapyridine, sulfadimethoxine.

While particular embodiments of the invention have been disclosed, various modifications will occur to those skilled in the art and it is desired to secure by these Letters Patent all such modifications.

What is claimed:

1. In a process for deriving a medicinal product from placenta by contacting the placenta with an acidic aqueous alcoholic solvent to provide an acidic solution of an extract containing active ingredients from the placenta dissolved in the solvent and leave a portion of the placenta undissolved as a placenta residue, wherein a base is added to the soluble portion of said extract so as to give it an alkaline pH and precipitate medicinal ingredients, the improvement for forming a new medicinal product which comprises, admixing with the soluble portion of said extract 10 to 5,000 weight percent based on solute not precipitated by said base of a salt of a metal chosen from the group consisting of an alkali and alkaline earth metals to form a salt complex which is thus precipitated from the solution, whereby a medicinal salt-complex product is derived, and isolating the precipitated salt-complex product.

2. A process according to claim 1 wherein said acidic extract solution is first maintained in the cold to precipitate protein material therefrom and separating the solution from the residue and protein material before adding the base.

3. The medicinal product which is the reaction product salt complex formed by the process of claim 1.

4. The improvement of claim 1 wherein base is first added to the soluble portion of said acidic extract and the resultant precipitate removed before addition of metal salt.

5. The method of treating osteoarthritis which comprises administering to the subject therapeutically effective amounts of the salt complex formed by the process of claim 1.

6. The method of claim 5 wherein said salt-complex is administered by injection in the form of a saline solution.

7. A process for deriving a medicinal product from placenta by steps comprising contacting the placenta with an acidic aqueous alcoholic solvent to provide an acidic solution of an extract containing active ingredients from the placenta dissolved in the solvent and leave a portion of the placenta undissolved as a placenta residue, adding a base to the solution so as to give it an alkaline pH and thus to effect precipitation of a medicinal product as a magnesium phosphate complex therefrom and provide a treated solution containing extract derived from the placenta, admixing extract of said treated solution containing active ingredients with a phosphate salt of a metal selected from the group consisting of alkali and alkaline earth metals in an amount of 10 to 5,000 weight percent based on solute not precipitated by said base to form a phosphate complex, whereby a second medicinal product is derived.

8. The medicinal product which is the second medicinal product formed by the process of claim 7.

9. The process of claim 7, wherein the base treated solution is evaporated to substantially remove the solvent therefrom and the resulting solvent-free extract is dissolved in water, and dibasic magnesium phosphate is added to the resulting aqueous solution, whereupon additional magnesium phosphate complex precipitates, said additional magnesium phosphate complex being of substantially the same medicinal values as is the first mentioned magnesium phosphate complex.

References Cited

UNITED STATES PATENTS 2,907,695  10/1959  Adam et al. _____ 167—74

OTHER REFERENCES

Chem. Abstracts 15892(g), vol. 50, 1956.

Progress in Protein Chemistry, Dixon et al., pp. 216–17, vol. 16, 1961.

Analytical Methods of Protein Chemistry, Alexander et al., 1960.

SAM ROSEN, Primary Examiner